(12) United States Patent
Scarfutti et al.

(10) Patent No.: US 11,086,742 B2
(45) Date of Patent: Aug. 10, 2021

(54) TASK BASED SERVICE MANAGEMENT PLATFORM

(71) Applicant: THE TORONTO-DOMINION BANK, Toronto (CA)

(72) Inventors: Joseph Vincent Scarfutti, Brooklyn, NY (US); Christian Caberoy De La Pena, Port Chester, NY (US); Aneesha Suresh Bulchandani, Hoboken, NJ (US); Sushant Suresh Yadav, Livingston, NJ (US); Lorenzo Coscarelli, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 167 days.

(21) Appl. No.: 16/554,476

(22) Filed: Aug. 28, 2019

(65) Prior Publication Data
US 2021/0064419 A1 Mar. 4, 2021

(51) Int. Cl.
*G06F 11/30* (2006.01)
*G06F 9/48* (2006.01)
*G06F 9/455* (2018.01)
*G06F 9/50* (2006.01)

(52) U.S. Cl.
CPC ...... *G06F 11/3006* (2013.01); *G06F 9/45558* (2013.01); *G06F 9/4856* (2013.01); *G06F 9/505* (2013.01); *G06F 11/3017* (2013.01); *G06F 2009/4557* (2013.01)

(58) Field of Classification Search
CPC .... G06F 9/4856; G06F 9/45558; G06F 9/505; G06F 2009/4557
See application file for complete search history.

(56) References Cited

U.S. PATENT DOCUMENTS

| | | | |
|---|---|---|---|
| 9,367,601 B2 * | 6/2016 | Babu | G06F 11/3466 |
| 2003/0212928 A1 * | 11/2003 | Srivastava | G06F 11/3082 714/47.3 |
| 2006/0187196 A1 | 8/2006 | Underkoffler et al. | |
| 2016/0179581 A1 * | 6/2016 | Soundararajan | G06F 9/5033 718/104 |
| 2017/0099200 A1 | 4/2017 | Ellenbogen et al. | |
| 2017/0177317 A1 | 6/2017 | Mark et al. | |
| 2017/0185677 A1 | 6/2017 | Anand et al. | |
| 2017/0323089 A1 | 11/2017 | Duggal et al. | |

(Continued)

*Primary Examiner* — Jacob D Dascomb
(74) *Attorney, Agent, or Firm* — Fenwick & West LLP

(57) ABSTRACT

A service management platform can implement functionality for one or more services, each of which can be independently used by a plurality of clients of the services. To activate the functionality of the one or more of the services, a hub server of the service management platform can assign a set of tasks to individual node servers for execution. The hub server can operate in a "supervisor environment" distinct from the processing environment used to execute the computationally intensive portions of the tasks. A task received at a node server can be managed by a supervisor process within the supervisor environment and executed by a native process within a native operating system environment, where the native process executes the computationally intensive calculations of the task and supervisor process provides communications and data transfer between the native process and rest of the service management platform.

20 Claims, 10 Drawing Sheets

(56) References Cited

U.S. PATENT DOCUMENTS

| | | |
|---|---|---|
| 2018/0054490 A1 | 2/2018 | Wadhwa et al. |
| 2018/0375999 A1 | 12/2018 | Molander et al. |
| 2019/0166011 A1* | 5/2019 | Cordray .................. H04L 41/12 |
| 2021/0089441 A1* | 3/2021 | Sivasubramanian ........................ G06F 16/217 |

* cited by examiner

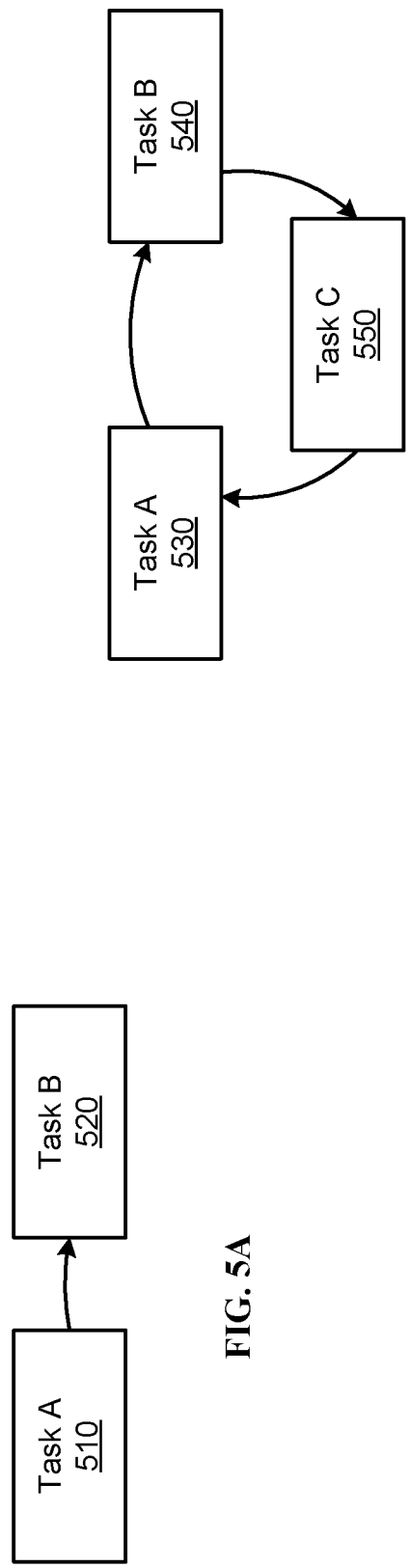
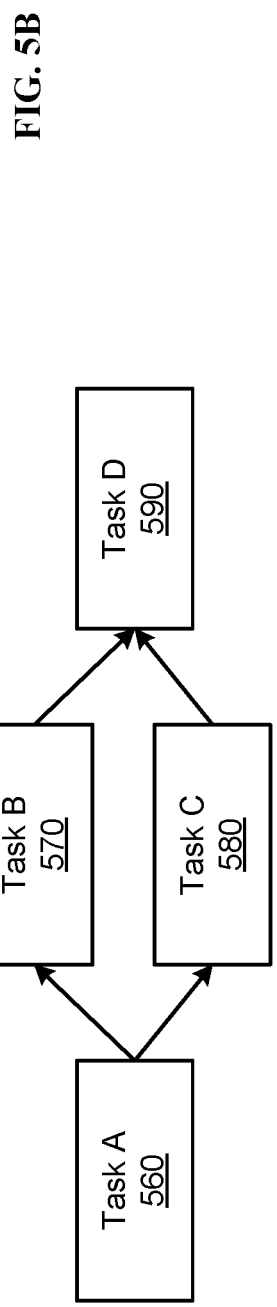
FIG. 5A
FIG. 5B
FIG. 5C

TASK BASED SERVICE MANAGEMENT PLATFORM

BACKGROUND

This disclosure relates generally to cloud-based services, and more specifically to a platform for scalably implementing functions for cloud-based services.

In many cases, developing a horizontally scalable service (a service simultaneously useable by a plurality of separate users providing separate inputs) requires additional time and resources compared to the "single user" implementation of the same service (an implementation capable of accepting inputs from a single user at a time), even if both the scaled and unscaled services perform the same functions. Further, developing a service to be executed in a distributed environment (where data processing may occur on disparate independent servers) can also introduce additional complexity. However, despite the added complexity, horizontal scalability and the use of cloud resources can be essential to allowing widespread use of a service, for example, to be accessed by many simultaneous users. Similarly, legacy services, for example, single user services, may need re-coding to implement horizontal scalability, as in the past many services were not programmed to allow horizontal scalability (or for operation on a distributed platform comprising multiple servers). For example, legacy services can be intended for single user execution, where the service responds to an input from a single user at a time (herein, a legacy application). Similarly, legacy services may not natively support orchestration of their features or functions with other services.

Therefore, developing or modifying services to be horizontally scalable across many simultaneous users in a cloud environment provides a challenge to developers, often requiring additional time and limiting the functionality developers can include in such cloud-based services.

SUMMARY

A service management platform can be used to execute some or all functions associated with one or more services, each of which can be independently used by a plurality of independent clients interacting with the service management platform. To activate the functionality of the one or more of the services, the service management platform can receive parameters (for example, user input from a client device) which the service management platform uses to generate a job for the service based on a job template. The job is then further subdivided into a set of tasks which can be individually executed by a set of node servers of the service management platform. To assign the tasks to individual node servers (and manage the results), the set of tasks are sent to a hub server, which in turn dispatches each task to an appropriate node server.

A node server receiving a dispatched task can receive the task on a service management agent using a supervisor environment distinct from the native environment of the node server (such as a virtual machine used to implement code in a coding language of the supervisor environment). The service management agent then creates a supervisor process within the supervisor environment to manage the execution of the task and a native process within a native environment to execute the task. In some implementations, the native process executes the computationally intensive calculations of the task and supervisor process provides communications and data transfer between the native process and the supervisor environment (for example, the service management agent of the node server and the hub server). The native process can, according to some embodiments, execute a legacy "single user" application (or portion of a legacy application) for which the service management platform can provide horizontal scalability. During the execution of the task, the native process can send one or more status updates (including a result of the task or an intermediate status of the task) to the first supervisor process, which can relay the status updates to the hub server via the service management agent.

BRIEF DESCRIPTION OF THE DRAWINGS

FIGS. 5A, 5B, and 5C are block diagrams illustrating relationships between tasks in a service management platform, according to an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
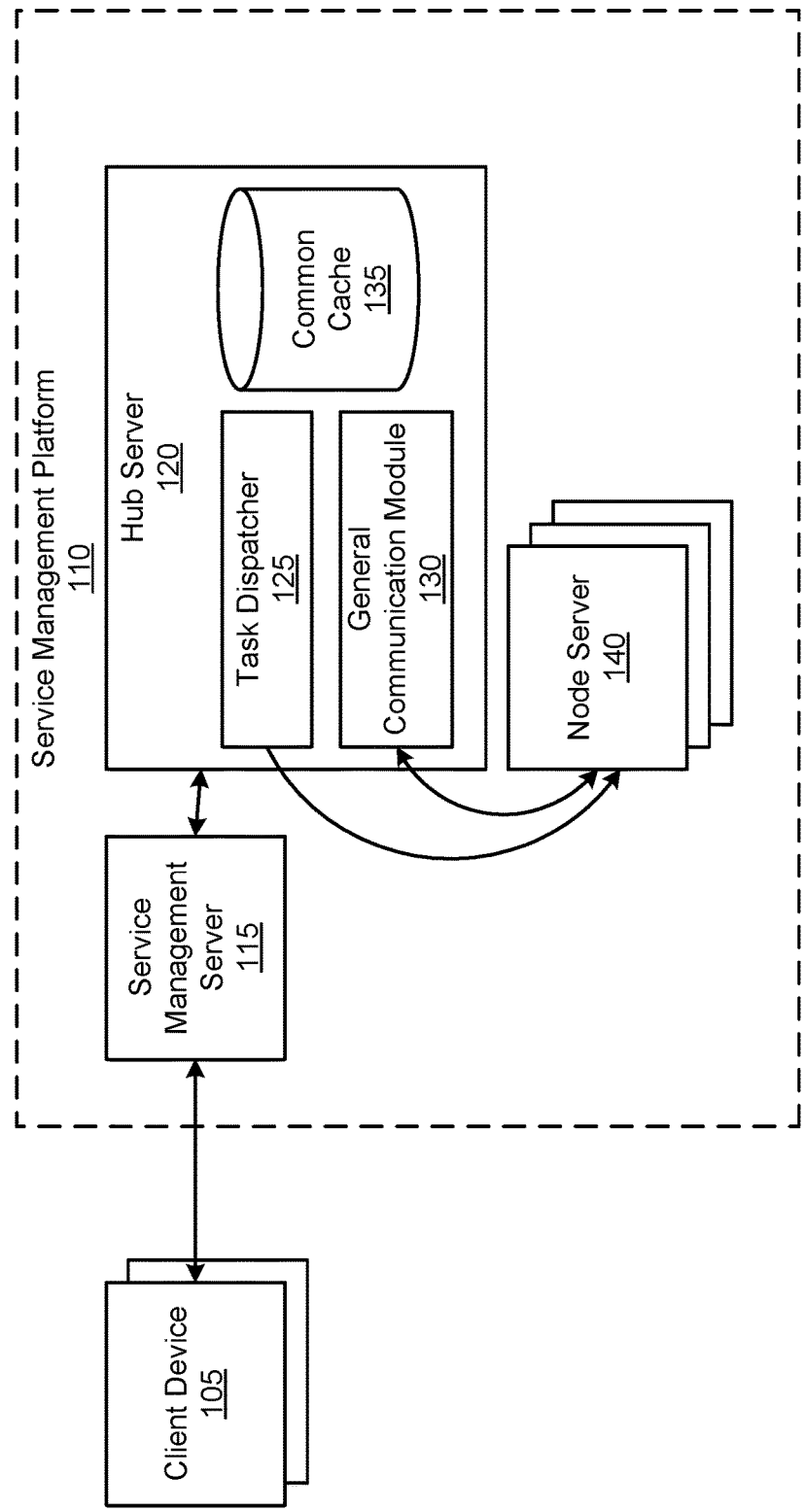
FIG. 1 is a block diagram of a system environment in which a service management platform operates, according to an embodiment.

FIG. 1 is a block diagram of a system environment in which a service management platform 110 operates, according to an embodiment. The system environment 100 shown by FIG. 1 comprises one or more client devices 105 and a service management platform 110. The service management platform 110 of FIG. 1 comprises a service management server 115, a hub server 120 comprising a task dispatcher 125, general communication module 130, and common cache 135, and one or more node servers 140 communicatively connected to the hub server 120. In other embodiments, different and/or additional components may be included in the system environment 100.

In the embodiment of FIG. 1, the service management server 115 generates a set of tasks for an associated service (for example, in response to input from a client device). On receiving one or more tasks from the service management server 115, the hub server 120 dispatches the received tasks to one of the set of node servers 140 for execution and waits to receive the results of the completed tasks from the node servers 140. In some embodiments, node servers can split the execution of a dispatched task between a native environment (such as the environment used by the operating system of the node server 140) and a distinct supervisor environment managing communications between the process and the hub server 120 (or other node servers). The execution of the task within the native environment of a node server 140 can comprise the execution of one or more legacy applications (or other legacy services) by the node server 140. In some implementations, the supervisor environment is implemented using a virtual machine (such as an Erlang virtual machine) running on the native operating system of the node server (such as Linux, UNIX, or Windows). Depending on the implementation, the supervisor environment can be chosen for fault tolerance (for example, where a crash in one process does not affect other concurrently executing processes), portability (for example, the ability to communicate with external native processes or legacy applications through a standard IO scheme), ease of communication (for example, implementations using communication channels and/or presentities to facilitate communication between processes or entities), and/or performance advantages over the native operating systems or other possible supervisor environments. The node servers 140 and the supervisor and native environments will be discussed further in relation to FIGS. 2A and 2B.

Each client device 105 comprises one or more computing devices capable of transmitting or requesting data from one or more services implemented on the service management platform 110. In one embodiment, a client device 105 is a conventional computer system, such as a desktop or laptop computer or a server system. Alternatively, a client device 105 can comprise another device having computer functionality such as a smartphone or internet of things device. In some embodiments, a client device 105 executes a service which uses the service management platform 110 to implement one or more functions provided by the service. For example, a client device 105 can request specific data (or an analysis of provided data) from the service management platform 110 or be provided an update on an event by the service management platform 110. For example, a client device 105 executes a browser application to enable interaction between the client device 105 and the service management platform 110. In other embodiments, a client device 105 interacts with the service management platform 110 through an application programming interface (API) associated with one or more services of the service management platform 110.

As described above, the service management platform 110 can generate a job for execution based on a job template and one or more input parameters. The job can be subdivided into a set of tasks, each executable by individual node servers 140 of the service management platform 110. For example, the service management platform 110 can be used to manage a service retrieving and processing data from a database based on user requests, such as a database storing player statistics for a sports league or, alternatively, a database storing financial transaction information. The service can include a job to analyze and compare database entries associated with several entities over a given time period, such as by comparing two player's statistics over several seasons or comparing the performance of several financial instruments over a period of time. In this example, the job can be split into three primary tasks, two devoted to collecting and analyzing each of the individual player's (or financial entity's) statistics and a third which can compare the results for each entity and generate a final result to return to the requesting user (in some embodiments, comprising an infographic or other graphical representation). Here, the first two tasks can be performed independently (for example, on separate node servers 140) and once both are completed, the third task can be generated based on the results of the first two tasks and performed, for example, on a third node server 140. Similarly, if the job requires the generation of an infographic or other graphical representation, the third task can be performed on a node server 140 with hardware adapted to more efficiently render graphics.

In some implementations, the client devices 105 are configured to communicate with the service management platform 110 via a network, which may comprise any combination of local area and/or wide area networks, using both wired and/or wireless communication systems. In some embodiments, the network uses standard communications technologies and/or protocols. For example, the network can include communication links using technologies such as Ethernet, 802.11, WiMAX, 3G, 4G, or CDMA and networking protocols used for communicating via the network include multiprotocol label switching (MPLS), transmission control protocol/Internet protocol (TCP/IP), hypertext transport protocol (HTTP), or any other suitable protocol. In some embodiments, all or some of the communication links of the network may be encrypted using any suitable technique or techniques.

The service management platform 110 is a computer system or set of computer systems that implements one or more functions associated with one or more services accessed by client devices 105. The service management platform 110 can be implemented on any suitable server, cluster of servers, set of network connected servers, or any combination of local and remote servers. The service management platform 110 of FIG. 1 comprises a service management server 115, a hub server 120, and one or more node servers 140. The service management platform 110 can receive inputs from one or more client devices 105 to run one or more services (or parts of services) implemented on the service management platform 110. For example, a client device 105 can provide one or more input parameters (or other suitable data) and a request to perform a function of a server to the service management platform 110. In response, the service management platform 110 can process the input parameters and return a corresponding output to the client device 105 for use or display. Similarly, in some embodiments, the service management platform provides regular or continuous outputs to one or more client devices 105. One service of the service management platform 110 can be used by multiple client devices 105 simultaneously (or by the same client device 105 multiple times), where each instance of the service is based on individualized parameters and individual results from the service management platform 110.

The service management server 115 of the service management platform 110 is a computer system capable of communicating with client devices 105 and generating tasks to be performed by the hub server 120 and node servers 140 responsive to communications from one or more client devices (such as input parameters) or any other triggering event. After the assigned tasks are executed, the service management server 115 can similarly transmit the results of the executed tasks to one or more client devices 105. The service management server 115 can be any server or set of servers and may be integrated or commonly located with the hub server 120, separate from the hub server 120 and fully or partially remote from the hub server 120.

In some embodiments, the service management server 115 represents each function of a service as a set of one or more jobs, where each job depends on one or more input parameters (for example, user input parameters) and outputs a result (which can be sent to a client device 105 for display or stored for later use. As used herein, a "job" of a service comprises code or other suitable instructions for executing functions of the service in response to one or more input parameters. Each generated job can comprise a set of one or more distinct tasks for execution by one or more node servers 140 of the service management platform 110. A "task," as used herein, refers to code or other suitable instructions for independently executing at least a portion of a job on a node server 140. In some embodiments, the tasks associated with a job are individually assigned to one of the node servers 140 for independent execution. Tasks can be assigned to node servers 140 dependent on the current load on each node server 140, based on the capabilities of a node server 140, or based on other factors affecting the execution of the task. A service of the service management platform 110 can comprise a set of job templates which the service management server 115 uses to generate tasks based on input parameters received from one or more client devices 105. In some embodiments, jobs templates associated with a service are arranged in a tree structure, where each job can initiate one or more tasks or other jobs of the service. For example, a job template can comprise instructions or code for one or more tasks into which the service management server inserts the received parameters or inputs. In some implementations, legacy applications or other existing services can be adapted for use with the service management platform 110 using a script to traverse config files of the legacy application and break the legacy application up into tasks and jobs performable by the service management platform. Similarly, a legacy application or existing service can be adapted manually, or services can be developed specifically for use with the service management platform 110.

After receiving user input from a client device 105 (or based on a triggering event or other received information), the service management server 115 can generate a job (and associated set of tasks) for an instance of the service associated with that client device 105. In some embodiments, the service management platform 110 provides improved horizontal scaling of the service to multiple simultaneous users, as even though each task is associated with a specific instance of the service, each task is independently executed by the hub server 120, regardless of how many other instances of that service are currently active. Therefore, the service management platform 110 provides horizontal scaling of the associated services, allowing easier development of new services and easier implementation of legacy services on the service management platform 110.

The hub server 120 is a server or cluster of servers which receives sets of tasks from the service management server 115 and individually dispatches the received tasks to one of the set of node servers 140, according to some embodiments. After the completion of a task at a node server 140, the node server 140 returns the result of the task to the hub server 120, which, depending on the specific task, can be returned to the service management server 115 to be transmitted for display by the client device 105 or stored for later use. In some implementations task results can also cause the hub server 120 (or service management server 115) to generate one or more additional tasks based on the results of the completed task. The hub server 120 is communicatively connected to the set of node servers 140 and, in some embodiments, facilitates communication between different node servers 140. In some implementations, the hub server 120 is implemented in a programming language common with the supervisor environment of the node servers 140. For example, the hub server 120 can execute in a virtual machine running over then native operating system of the server hardware (such as Linux, UNIX, Windows, or another suitable operating system). For example, the hub server 120 can be implemented in an Erlang virtual machine. As described above, the hub server 120 can comprise a task dispatcher 125, general communication module 130, and common cache 135.

The task dispatcher 125 of the hub server 120 can assign tasks to one or more node servers 140 for execution, and, in some implementations, receive confirmation from the node server 140 that accepting the task. The task dispatcher 125 can use a communication channel to broadcast pending tasks to one or more node servers 140. For example, the task dispatcher 125 can communicate over the communication channel using "publication-subscription" (pub-sub) system. In a pub-sub system, one or more node servers 140 subscribe to and monitor the task dispatcher's communication channel for messages relevant to that node server 140. In other embodiments, the task dispatcher 125 can broadcast tasks to the node servers 140 using a message queue (for example, using Kafka), using a request/reply model, and/or by directly streaming data to and from the node server 140.

The task dispatcher 125 can broadcast messages associated with currently available tasks over the communication channel, and, in some embodiments, receive confirmations for accepted tasks from the node servers 140. In some implementations, a pending task can be broadcast to one or more node servers 140, or to one or more specifically selected node servers 140 (for example, based on the specific capabilities or current load of each node server 140) over the generated communication channel. The set of node servers 140 selected for a given task can depend on one or more criteria, such as current load on the node server 140, specific or unique capabilities of the node servers 140, a connection strength to the hub server 120, a security level of the node server 140, or other factors affecting the speed of executing the tasks. In some embodiments, the task dispatcher 125 uses a "websocket" implementation to broadcast or dispatch tasks to the set of node servers 140. In some implementations, constant or uninterrupted communication between the task dispatcher 125 and the node server 140 is not required for the continued operation of the service management platform 110, for example, in the case of a websocket implementation of the task dispatcher 125. In these implementations, if communication between the node servers 140 and the task dispatcher 125 fails, the node servers 140 can continue executing already assigned tasks, but may not receive additional dispatched tasks until communication is restored.

The general communication module 130 of the hub server 120 can communicate of messages and data between the hub server 120 and the node servers 140. In some embodiments, the general communication module 130 handles communications from the node servers 140 relating to currently executing or completed tasks (after the tasks have been dispatched by the task dispatcher 125). For example, the general communication module 130 can receive status updates, requests for information, and the results of completed tasks from node servers 140 and return responses (such as requested information) to the node servers 140.

Similarly, in some embodiments, the general communication module 130 can serve as an intermediary for messages or communications between different node servers 140 (and, by extension, between tasks executing on separate node servers 140). In some implementations, the general communication module 130 operates a communication channel (herein, the "common channel") over which the node servers 140 can communicate with the hub server 120. As described above in relation to the task dispatcher 125, the common channel can similarly use a pub-sub system, a message queue (for example, implemented using Kafka), direct streaming of data, a request/reply model, or other suitable techniques to transmit information between the hub server 120 and the node servers 140.

In some embodiments, the general communication module 130 receives intermediate states or other status updates for tasks executing on the node servers 140 over the common channel. In some implementations, each task can is associated with a "presentity" (presence-entity) on the common channel which can provide updated information about the task to other entities (such as the hub server 120, node servers 140, and other tasks executing on a node server 140) connected to the common channel. In some embodiments, the presentity associated with each task is updated by the associated dispatch module 225 with a current state of the task (for example, not initialized, running, or ended) by the dispatch module 225 and monitored by other tasks and/or the general communication module 130 to determine which tasks are currently executing (and on what node servers 140) and their current state. This information can be used to balance assigned tasks across the set of node servers 140 (for example, when determining which node servers 140 to assign a given task to).

The common cache 135 can be a cache, store, or other data repository storing data relevant to the execution of one or more tasks by the node servers 140. In some implementations, each of the node servers 140 can access the cached data in the common cache 135. For example, a node server 140 can request specific data from the common cache 135 through the general communication module 130. Although the common cache 135 is a unified cache located at the hub server 120 in the embodiment of FIG. 1, in other implementations the common cache 135 can be located at the hub server 120, on a distinct cache server, on a node server 140, or may be distributed across a plurality of node servers 140 and/or other servers. For example, the common cache 135 can be a distributed cache located on a subset of the node servers 140, but still accessible to each of the node servers 140. In some embodiments, the common cache 135 is implemented in the programming language of the hub server 120 and the supervisor environment of the node servers 140. For example, the common cache 135 can be an Erlang database if the hub server 120 and node servers 140 are at least partially implemented in Erlang. The common cache 135 can store data required to execute a plurality of similar tasks, such as a database commonly referenced or updated by a service of the service management platform 110, for example, a database of transaction information for a financial service.

Each node server 140 is a computer system which can receive and execute tasks dispatched from the hub server 120 and return one or more results of the execution of the tasks to the hub server 140. For example, a node server 140 can a server, server cluster, or a virtual machine or designated portion of a larger server system. Each individual node server 140 may have different or unique characteristics, performance levels, or capabilities (for example, due to different hardware configurations between node servers 140), that may make one node server 140 more suitable for a certain task or type of task than another node server 140. For example, a subset of the node servers 140 can be adapted to tasks executed using parallel processing while a second subset are optimized for single thread performance. In some implementations, the task dispatcher 125 of the hub server 120 dispatches or assigns tasks to node servers 140 at least partially based on these considerations.

Figure 2A:
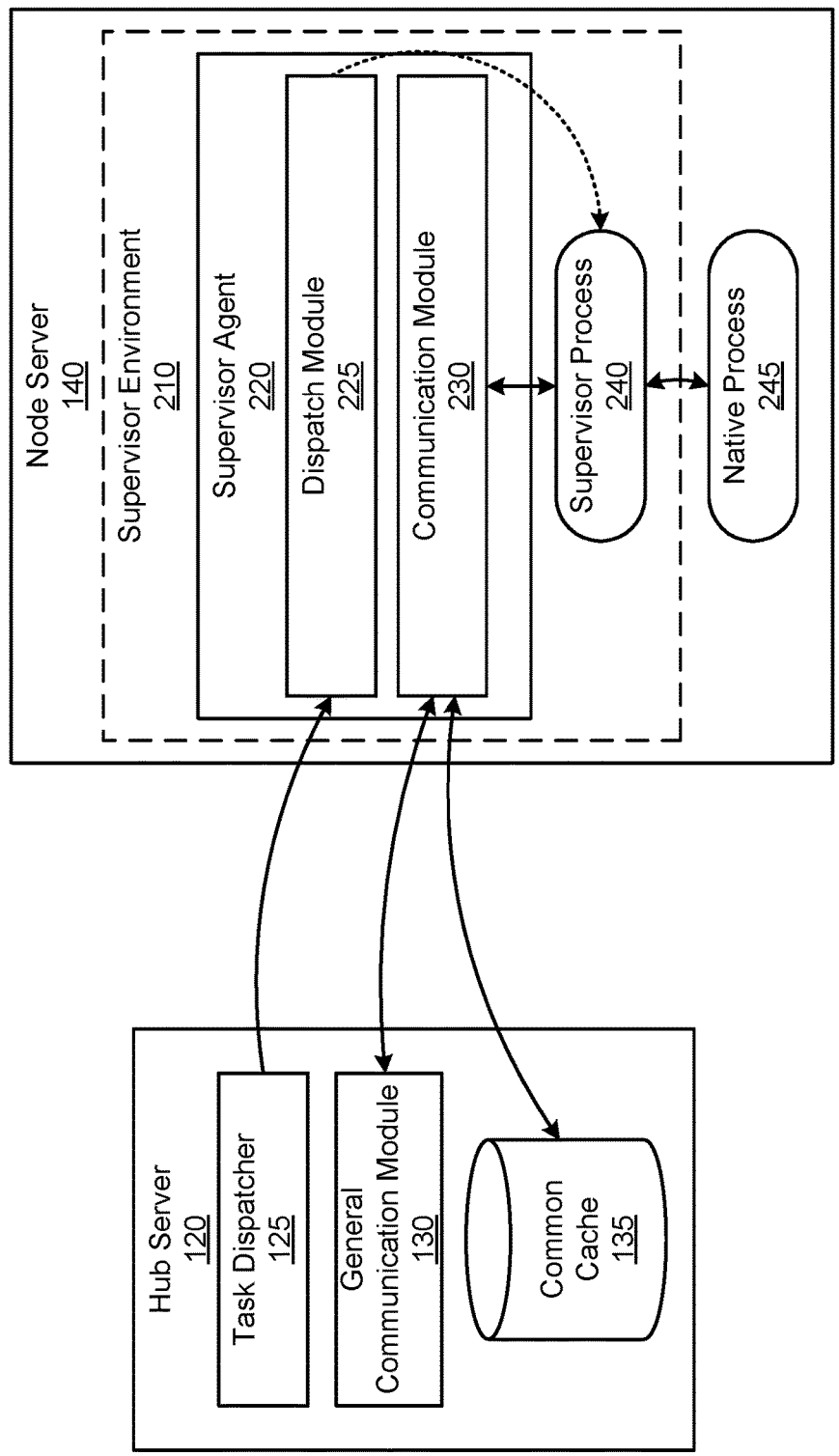
FIG. 2A is a block diagram of a node server, according to an embodiment.

FIG. 2A is a block diagram of a node server, according to an embodiment. As described above, the node server 140 can receive and execute tasks dispatched from the hub server 120. As described above, the node server 140 can comprise two distinct computing environments: a native environment (for example, the environment native to the hardware and/or operating system of the node server 140 is implemented on) and the supervisor environment 210, as described above. The node server 140 shown by FIG. 1 comprises a supervisor environment 210 and native environment, each executing distinct processes to jointly execute an assigned task. For example, the supervisor environment 210 can be implemented as a virtual machine running within the native environment. The supervisor environment 210 can be selected for ease of scalability and efficient communication with the hub server 120 (for example, by using a virtual machine of the same programming language of the hub server 120), according to some embodiments. In some implementations, the use of a supervisor environment 210 for communication with the hub server 120 enhances the portability of node server 140 code and allowing it to be run across different hardware on different node servers, as the same supervisor environment virtual machine can be used for node servers 140 with a variety of native environments and operating systems. For example, an Erlang virtual machine can be run on top of many different operating systems. In some implementations, computations within the supervisor environment 210 may be relatively less efficient than computations performed in the native environment of the node server 140. For example, the chosen supervisor environment 210 can result in additional overhead (such as where the supervisor environment 210 is a virtual machine within the native environment) or may have other characteristics reducing computational efficiency. Further, one or more legacy applications can be implemented in the native environment of one or more node servers 140, allowing the use of the legacy applications without reprogramming functionality into the supervisor environment 210. Therefore, in some embodiments, the execution of a task at a node server 140 is split such that communication with the hub server 120 and management of the task occurs within the supervisor environment 210, while computationally demanding portions of the dispatched tasks occur in the native environment of the node server 140.

The supervisor environment 210 of the node server 140 includes a supervisor agent 220 comprising a dispatch module 225 and a communication module 230. To execute tasks, the node server 140 executes one or more supervisor processes 240 in the supervisor environment 210, where each supervisor process can be associated with a corresponding native process 245 in the native environment of the node server 140. In other embodiments, different and/or additional components or functionality may be included in the node server 140.

The supervisor agent 220 of a node server 140 can, according to some embodiments, initialize processes to execute tasks dispatched from the hub server 120, monitor and report to the hub server 120 the status of currently executing tasks, and detect and handle processes that have expectedly or unexpectedly terminated (including setting up the process to be reinitialized, if needed). To perform these functions, the supervisor agent 220 can communicate with the hub server 120 to receive dispatched tasks for execution, to send status updates for currently executing tasks, to pass messages or information between node servers 140, to transmit the results of a completed task to the hub server 120, or as a part of communicating with another node server 140 (or other user or entity of the service management platform 110). In some embodiments, the initialization, monitoring/reporting, and termination handling functions of the node server 140 are independently handled by the supervisor agent 220. For example, each function can be handled concurrently and independently by separate modules and/or processes of the supervisor agent 220. This embodiment of the supervisor agent 220 is discussed further in relation to FIG. 2B. In the embodiment of FIG. 2A, the supervisor agent 220 comprises multiple communication links with the hub server 120, for example, the dispatch module 225 can communicate with the hub server 120 via the task dispatcher 125 and the communication module 230 can communicate with the hub server 120 via the general communication module 130 and the common channel. In other embodiments, communication with the hub server 120 can be handled by any number of communication links.

The dispatch module 225 can receive indications of available tasks from the task dispatcher 125, accept or confirm receipt of one or more assigned tasks, and, in some implementations, initialize the accepted tasks on the node server 140. In some embodiments, dispatched tasks can be associated with specific criteria describing which node servers 140 should execute the task (for example, in an implementation where tasks are broadcast to all node servers 140 using a websocket protocol, but where the node servers 140 have distinct capabilities). In some implementations, the dispatch module 225 checks one or more criteria before accepting the task. For example, the dispatch module 225 can check the current load on the node server 140 and the estimated load of the task and accepts the task if the node server 140 is able (for example, has the available bandwidth) to execute the task. In some embodiments, the dispatch module 225 sends or broadcasts a confirmation that the task is being executed to the hub server 120 and/or the other node servers 140 as the task is accepted. The dispatch module 225 initializes an appropriate supervisor process 240 within the supervisor environment 210 to manage the execution of the task on the node server 140, according to some embodiments. In some implementations, each task comprises the code for initializing and running the supervisor process 240 to manage the task. When initializing the supervisor process 240, the dispatch module 225 can select an identifier for the supervisor process 240 which does not conflict or create a name collision with any other currently executing supervisor process 240 (such as in the case of similar tasks resulting from different instances of the same service).

The communication module 230 of the supervisor agent 220 can, as described above, facilitate communication between currently executing tasks (for example, via an associated supervisor process 240) and the hub server 120, another node server 140, or other supervisor processes 240 on the same node server 140. The communication module 230 can monitor currently executing tasks for status updates or requests for information and transmit the received status updates, requests for information, or other messages from the node server 140 to the hub server 120. Similarly, the communication module 230 can receive requested information or other instructions from the hub server 120 and distribute the requested information to a supervisor process 240. As described above, the communication module 230 of a hub server 140 can communicate with the general communication module 130 using a pub-sub model, a message queue (for example, implemented with Kafka), or another suitable technique to send messages to the hub server 120 or other node servers 140. In some embodiments, the general communication module 130 of the hub server 120 is used to relay messages between node servers 140. The communication module 230 can communicate status updates about one or more tasks executing on the node server 140, the output or result of one or more tasks and requests for additional information from the hub server 120 or another suitable location (such as the common cache 135) over the common channel of the general communication module 130. In some implementations, the communication module 230 also facilitates communication between separate supervisor processes 240 operating on the same node server 140.

The supervisor agent 220 can also include a termination module which can monitor for and handle the unexpected termination of tasks (including supervisor processes 240 and native processes 245) executing on the node server 140. For example, tasks can encounter a bug or glitch, receive corrupted input, run out of memory, be terminated by the operating system, or fail for any other reason during execution. After the unexpected termination of a task, the associated supervisor process 240 (or the termination module of the supervisor environment 210) can recognize that the task has failed or is no longer executing (for example, due to a lack of status updates or through detecting that a process ID associated with the task has been terminated). After detecting that the task has unexpectedly terminated, the termination module can prepare to reinitialize the task, either from the start or based on an intermediate status of the task.

A supervisor process 240, according to some embodiments, is a process (or set of processes) within the supervisor environment 210 that manages the execution of a task assigned to the node server 140. For example, a supervisor process 240 can be an Erlang thread or process executing within an Erlang virtual machine (for example, the supervisor environment 210). As described above, a supervisor process 240 can be initialized by the dispatch module 225 in response to a task being dispatched from the hub server 120. A supervisor process 240 can initialize (or otherwise be associated with) a corresponding native process 245 to execute the assigned task. A native process 240, according to some embodiments, is a process (or set of processes) within the native environment of the node server 140 that executes at least a portion of a task assigned to the node server 140. The specific structure and functionality of the native process 245 depends on the assigned task, like the supervisor process 240, code or instructions for generating the native process 245 can be included with the assigned task. In some implementations, a supervisor process 240 can execute an assigned task without a corresponding native process 245 depending on the specific task. For example, tasks which aren't computationally intensive enough to warrant the additional overhead of initializing a native process 245 can be executed by a supervisor process 240 with no associated native process 245. Similarly, a task may be associated with a plurality of native processes 245, depending on the implementation of the task. The structure of a supervisor process 240 (and the corresponding native process 245) is based on the associated task and may be based on, included with, or otherwise determined by the assigned task dispatched from the hub server 120. In some implementations, the use of a common channel for communication between node servers 140 and the hub server 120 (for example, using presentities for viewing supervisor processes 240 and tasks being executed across other node servers 140, as described above) allows the supervisor process 240 to determine which other tasks are being executed on other node servers 140 and to request information from the other tasks if needed. As described above, the supervisor process 240 for a task can be implemented as a set of discrete processes which may be in communication with each other and the supervisor agent 220.

A native process 245 can communicate with the supervisor process 240 as it executes, for example, to provide an intermediate state of the native process 245 or other status update, to request additional information, or to provide an end result of the execution of the task. As the native process 245 executes the task, the supervisor process 240 can monitor the progress of the native process 245 and handle communication between the native process 245 and other entities, for example by providing updates on the results or intermediate progress of the task to the supervisor agent 220 and/or the hub server 120. In some implementations, the status updates provided by the supervisor process 240 about the task are check ins or intermediate results, which can be used by the service management system 110 to determine that the native process 245 is still functioning as expected. In other embodiments, one or more of status updates are intermediate states of the native process 245, which can enable the native process 245 to be reinitialized in the case of an unexpected termination. The specific content of a status update from a native process 245 may depend on the assigned task or the native application being used to execute the task and can be defined by the supervisor agent 220 or the dispatched task received from the hub server 120.

As described above, a supervisor process 240 can initialize (or request that the supervisor agent 220 initialize) a corresponding native process 245. Subsequently, the supervisor process 240 can receive status updates from the native process 245 that can be passed on to the supervisor agent 220 and from there to the hub server 120. Further, the supervisor process 240 can, if needed, request additional information from a suitable source (such as the common cache 135) and pass the received data to the native process 245 for continued execution. In some implementations, the supervisor process 240 can reinitialize the corresponding native process 245 based on an intermediate state of the native process 245 provided to the supervisor process 240 as a status update. Then, if the supervisor process 240 detects that the native process 245 has unexpectedly terminated, the supervisor process 240 can reinitialize the native process 245 using the intermediate state as an input when initializing the native process 245.

Figure 2B:
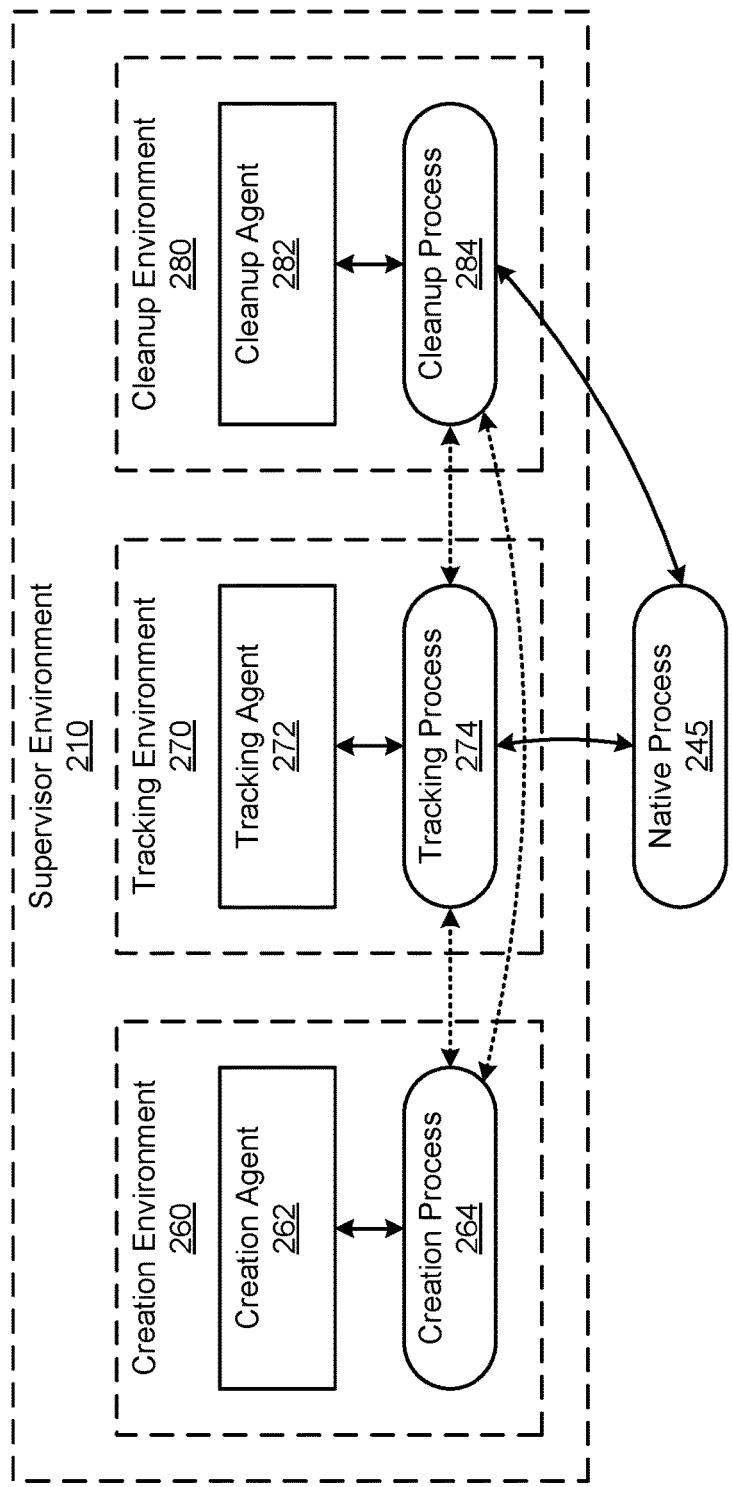
FIG. 2B is a block diagram of a supervisor environment of a node server, according to an embodiment.

As described above, the initialization, monitoring/reporting, and termination handling functions of the node server 140 can be independently handled by the supervisor agent 220. For example, each function can be handled concurrently and independently by separate agents and processes in the supervisor environment 210. FIG. 2B is a block diagram of a supervisor environment of a node server, according to an embodiment. In the embodiment of FIG. 2B, the supervisor environment 210 includes separate creation, tracking, and cleanup environments 260, 270, and 280 containing agents which independently handle the creation and initialization of tasks, the monitoring and tracking of tasks, and the detection of and cleanup after terminated tasks, respectively. In some embodiments, the creation, tracking, and cleanup environments 260, 270, and 280 are each a separate virtual machine environment (such as an Erlang virtual machine, as described above) with a corresponding agent (such as the creation agent 262, the tracking agent 272, and the cleanup agent 282) and supervisor processes (such as the creation process 264, the tracking process 274, and the cleanup process 284).

In the embodiment of FIG. 2B, the creation agent 262, tracking agent 272, and cleanup agent 282 collectively provide the functions of the supervisor agent 220 and the creation process 264, tracking process 274, and cleanup process 284 collectively provide the functions of the supervisor process 240 to manage the native process 245. The use of separate agents 262, 272, and 282 and supervisor processes 264, 274, and 284 can allow for more efficient scaling to handle multiple tasks on the same node server 140 (as the functions of the supervisor agent 220 are split across multiple specialized agents 262, 272, and 282) and increased fault tolerance for the system. For example, if one of the creation agent 262, tracking agent 272, or cleanup agent 282 unexpectedly fails, the remaining agents can continue functioning and reinitialize the failed agent. For example, if the creation agent 262 fails, tasks already executing on the node server 140 can continue executing and sending status updates via the tracking agent 272 independent of the creation agent 262.

The creation agent 262, according to some embodiments, can perform some or all functions of the dispatch module 225. In the embodiment of FIG. 2B, the creation agent 262 can receive indications of an available task (for example, from the task dispatcher 125), accept the tasks, and initialize the accepted task on the node server 140. As described above, the creation agent 262 can, checks one or more criteria before accepting the task. For example, the creation agent 262 can check the current load on the node server 140 and the estimated load of the task and accepts the task if the node server 140 is able (for example, has the available bandwidth) to execute the task. Similarly, the creation agent 262 can verify the completeness/correctness of the provided task before proceeding with initialization. To initialize an accepted task on the node server 140, the creation agent 262 can generate a creation process 264, which will in turn initialize the tracking process 274 and cleanup process 284 for the task (for example, by sending a request to the tracking agent 274 and cleanup agent 284).

The tracking agent 272, according to some embodiments, can perform some or all functions of the communication module 230. In the embodiment of FIG. 2B, the tracking agent can monitor currently executing tasks for status updates or requests for information and transmit or receive messages to the hub server 120. Similarly, the tracking agent 272 can receive requested information or other instructions from the hub server 120 and distribute the requested information within the node server 140. In some embodiments, the tracking agent 272 detect when a native process 245 has unexpectedly terminated (for example, due to a lack of expected status updates) and report that the associated task is down to the cleanup agent 282 (or the associated cleanup process 284). The tracking process 274 for a task can, after being initialized by the corresponding creation process 264, initialize and monitor the native process 245 for the task, for example, to receive status updates or to pass additional information to the native process 245.

The cleanup agent 282 can perform some or all functions of the termination module of the supervisor agent 220. For example, the cleanup agent 282 can monitor for the termination tasks (or native processes 245) and, through the associated cleanup process 284, take appropriate action, such as restarting the task in the case of an unexpected termination or cleaning up the OS processes and other supervisor processes (for example, the creation process 264 and the tracking process 274) on the successful completion of a task. In some embodiments, the cleanup agent 282 can monitor for terminated tasks by checking a native operating system maintained register or list of currently executing native processes 245. After detecting that a task is to be terminated (for example, based on an instruction received from the hub server 120, from the cleanup agent 282, or from another suitable source), the associated cleanup process 284 can send instructions to kill the native process 245 (if it is still executing) and the associated creation process 264 and tracking process 274. If the task is to be restarted, the cleanup process 284 can instead instruct the associated creation process 284 to reinitialize the task, either from the start or based on an intermediate status of the task.

Task Dispatch and Execution

Figure 3A:
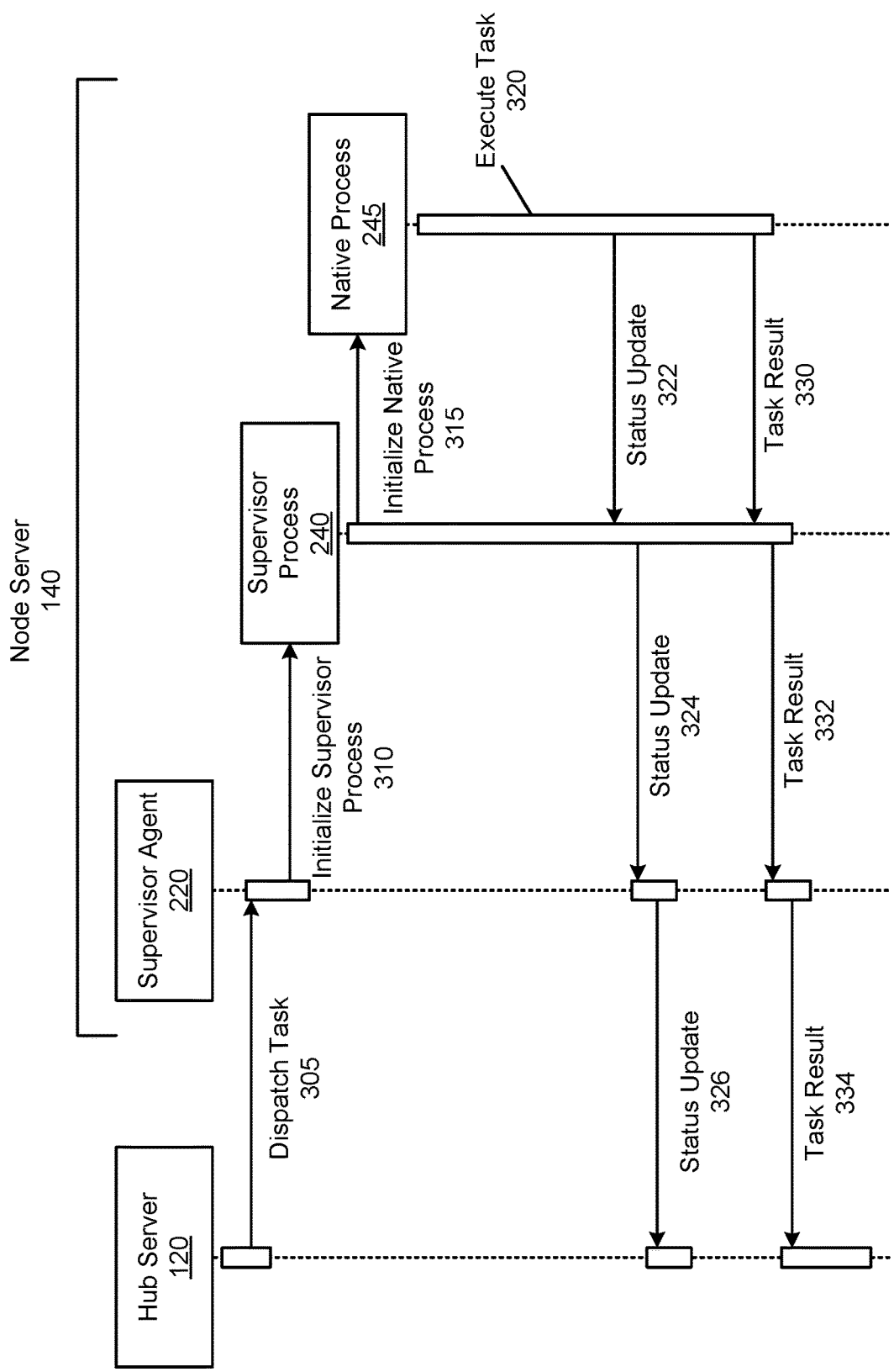
FIG. 3A is an interaction diagram illustrating the dispatch and execution of a task on a service management platform, according to an embodiment.

FIG. 3A is an interaction diagram illustrating the dispatch and execution of a task on a service management platform, according to an embodiment. The interaction diagram 300 of FIG. 3A gives an overview of an example method of dispatching and executing a task in a service management platform 110. In the embodiment of FIG. 3A, tasks are dispatched from the hub server 120 and executed by the node server 140, which further includes the supervisor agent 220, supervisor process 240, and native process 245.

In FIG. 3A, the process of dispatching a task begins at the hub server 120, which has a task to be executed at a node server. As described above, the hub server 120 can receive new tasks received from the service management server 115, generate tasks based on the completion of a previous task, or otherwise receive a task from another source. The task is then dispatched 305 from the hub server 120 to the supervisor agent 220 of the node server 140. As described above, the task can be received by the dispatch module 225 of the supervisor agent 220, which then initializes 310 a supervisor process 240 to manage the execution of the task on the node server 140. Once initialized, the supervisor process 240 can in turn initialize 315 (or have initialized) a native process 245 to execute the task in the native environment of the node server 140.

In the embodiment of FIG. 3A, the supervisor process 240 monitors the associated native process 245 for status updates, information requests, and other suitable communication as the native process 245 executes 320 the task in the native environment of the node server 140. In this embodiment, the native process 245 sends 322 at least one status update on the execution of the task to the supervisor process 240. As described above, a status update can comprise an intermediate result or an intermediate state of the native process. Once received by the supervisor process 240, the status update can be relayed 324 to the supervisor agent 220 and further 326 from the supervisor agent 220 to the hub server 120. For example, status updates or other messages can be relayed through the communication module 230 of the supervisor agent 220 and the general communication module 130 of the hub server 120. In this embodiment, the native process 245 completes executing 320 the task and transmits 330 the end result to the supervisor process 240, where it is similarly sent 332, 334 to the hub server 120 via the communication module 230 of the supervisor agent 220 and the general communication module 130 of the hub server 120. After the end result of the task is determined and transmitted, the native process 245 and the supervisor process 240 terminate and the processing resources can be used to execute another task.

Figure 3B:
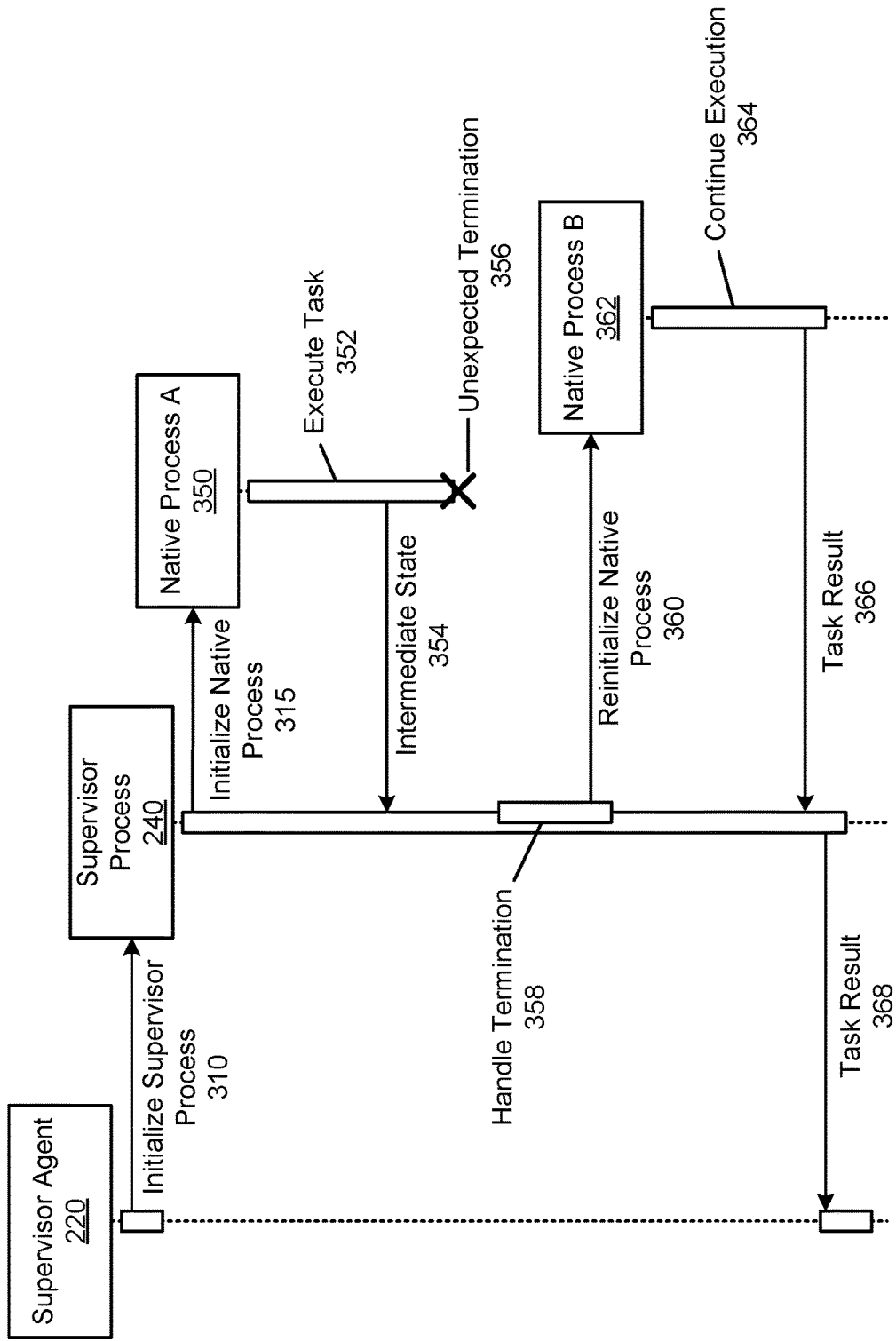
FIG. 3B is an interaction diagram illustrating the reinitialization of a task in response to an unexpected termination, according to an embodiment.

FIG. 3B is an interaction diagram illustrating the reinitialization of a task in response to an unexpected termination, according to an embodiment. The interaction diagram 340 of FIG. 3B gives an overview of an example method of dispatching and executing a task in a service management platform 110 in a situation where a first native process 245 associated with the task unexpectedly terminates while executing the task. In the embodiment of FIG. 3B, similar to the embodiment of FIG. 3A, tasks are dispatched from the hub server 120 (not shown) and executed by the node server 140, which further includes the supervisor agent 220, supervisor process 240, and native processes A 350 and B 362.

Here, the supervisor agent 220 of the node server 140, which then initializes 310 a supervisor process 240 to manage the execution of a received task. Once initialized, the supervisor process 240 in turn initializes 315 (or has initialized) the native process A 350 to execute the task. In this embodiment, the supervisor process 240 monitors the execution of the associated native process A 350. After initialization, the native process A 350 begins executing 352 the task. In this case, after some progress is made on the task, the native process A 350 transmits an intermediate state 354 of the native process A 350 to the supervisor process 240. In the embodiment of FIG. 3B, the native process A 350 unexpectedly terminates 356 at some point after the intermediate state 354 was sent. For example, the native process A may encounter a bug or glitch, receive corrupted input, run out of memory, be terminated by the operating system, or fail for any other reason. After the unexpected termination 356, the supervisor process can recognize that the native process A 350 is no longer executing (for example, due to a lack of status updates or through detecting that the process ID of the native process A 350 has been terminated). Responsive to the native process A 250 being terminated, the supervisor process 240 can handle 358 the termination by reinitializing 360 the native process B 362 based on the intermediate state 354 of the native process A 350 (for example, by providing the intermediate state 354 as an input when reinitializing the native process A 350. The newly initialized native process B 362 can then continue 364 the execution of the task from the point of the intermediate state 354. In this embodiment, the native process B 362 completes executing the task and transmits 366 the end result of the task to the supervisor process 240, where can be passed 368 to the supervisor agent 220 and ultimately to the hub server 120 (not shown). In other cases, an unexpectedly terminated native process 245 may be reinitialized from the beginning, for example, if no intermediate state of the native process 245 was received prior to the unexpected termination, or if no received status update was sufficient to reinitialize the process from an intermediate state.

Figure 3C:
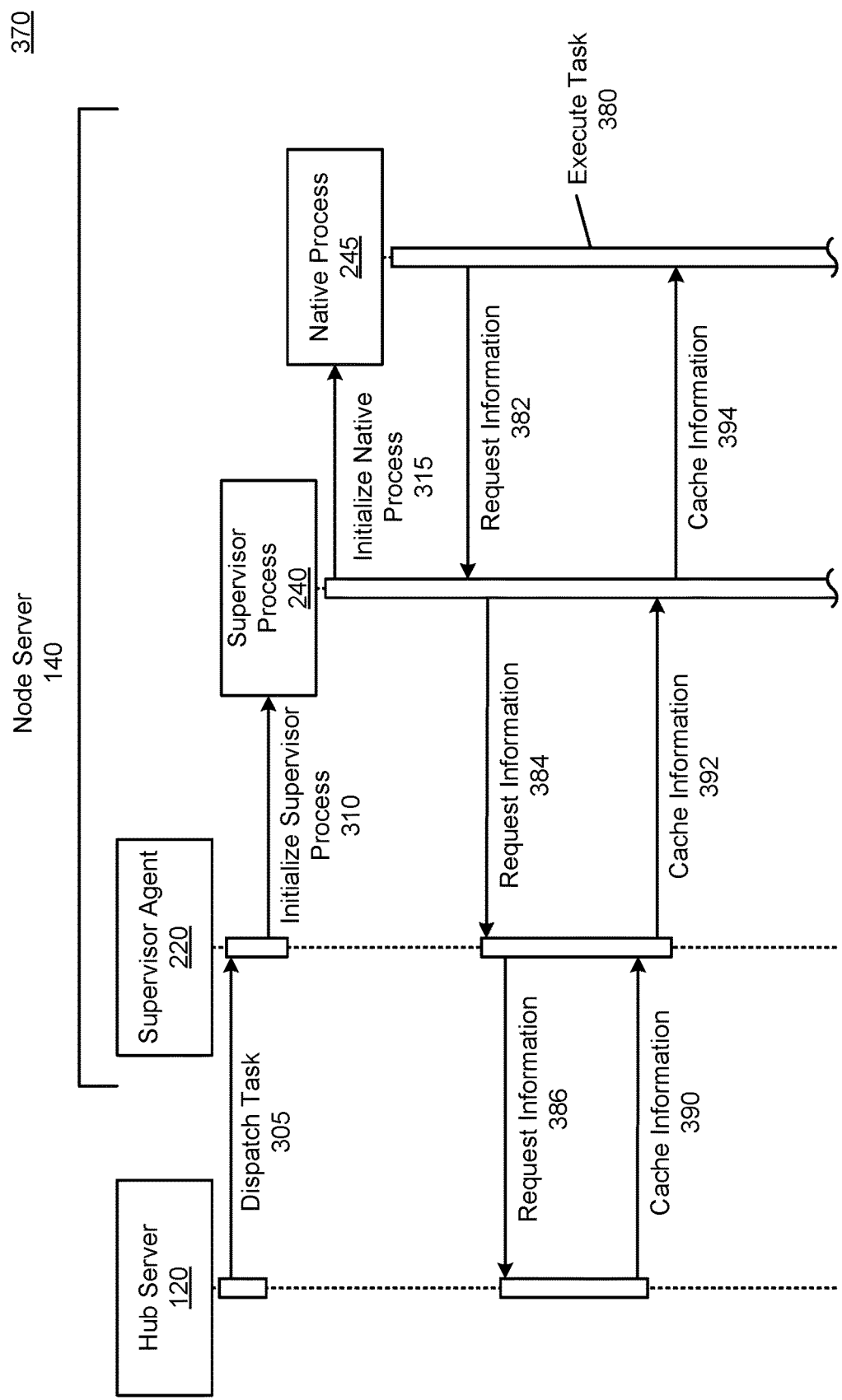
FIG. 3C is an interaction diagram of a node server process accessing information stored in a common cache of the service management platform, according to an embodiment.

FIG. 3C is an interaction diagram of a node server process accessing information stored in a common cache 135 of the service management platform, according to an embodiment. The interaction diagram 370 of FIG. 3C gives an overview of an example process for requesting information from a cache of the service management platform 110. As described above, a task is dispatched 305 from the hub server 120 and executed by the node server 140, which includes the supervisor agent 220, supervisor process 240, and native process 245. As described above, the dispatched task is received by the dispatch module 225 of the supervisor agent 220, which then initializes 310 a supervisor process 240 to manage the execution of the task. Once initialized, the supervisor process can in turn initialize 315 (or have initialized) a native process 245 to execute 380 a native application to perform the task.

In the embodiment of FIG. 3C, the native process 245 transmits 382 a request for additional information to the supervisor process 240 the task is being executed. Once received by the supervisor process 240, the information request can be relayed 384 to the supervisor agent 220 and further relayed 386 to the hub server 120. Here, the requested information is stored in the common cache 135, but, in other embodiments, information requests can be made to a local cache of the node server 140, to information available as part of a concurrently executing task, or in any other location accessible to the service management platform 110. In the embodiment of FIG. 3C, after the hub server 120 receives the information request, the desired information can be retrieved from the common cache 135 and transmitted 390 over the general communication module 130 to the communication module 230 of the supervisor agent 220 and further 392, 394 to the supervisor process 240 and native process 245. Depending on the task and information requested, the native process 245 can stop execution while waiting for the requested information to be provided. Similarly, depending on the task, at what point and for how long the native process 245 waits for the requested information can vary. After the requested information is received at the native process 245, the execution of the task can continue based on the received cache information.

Node Server Process Structure

Figure 4A:
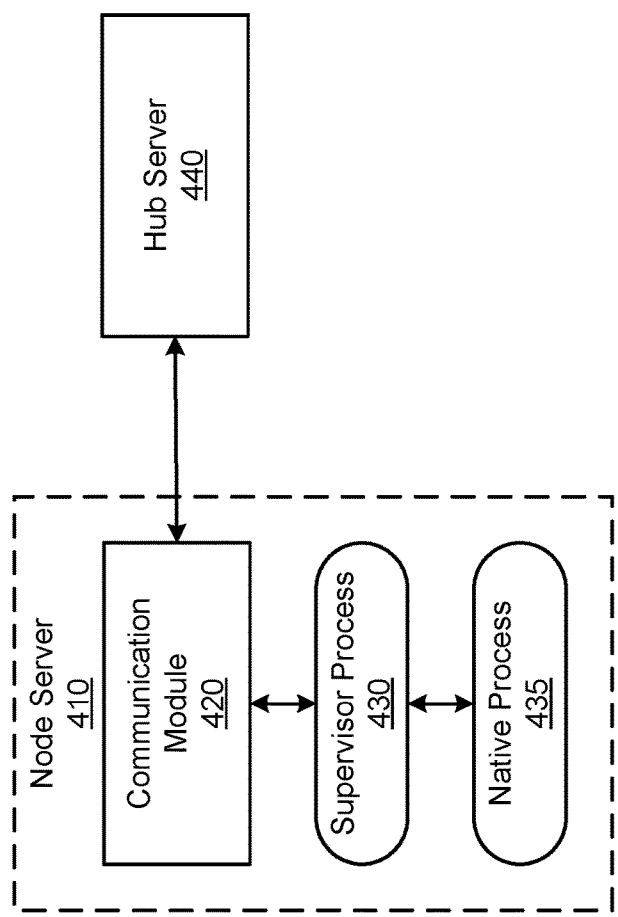
FIG. 4A is a block diagram illustrating a task executed using a single supervisor process structure for executing a task, according to an embodiment.

As described above, a node server can execute multiple supervisor processes 240 and native process 245 to execute a task. However, in some embodiments, different tasks require different structures of supervisor processes 240 and native processes 245. FIG. 4A is a block diagram illustrating a single supervisor process structure for executing a task, according to an embodiment. The environment 400 of FIG. 4A comprises a hub server 440 and a node server 410 including a communication module 420, supervisor process 430, and native process 435, each involved in the execution of an example task. Here, as described above, the node server 410 receives a task dispatched from the hub server 440 through the communication module 420. In response to receiving the task, the supervisor process 430 and native process 435 can be initialized to execute the task. In some embodiments, the supervisor can communicate with the hub server 440 and, by extension, other node servers 140.

Figure 4B:
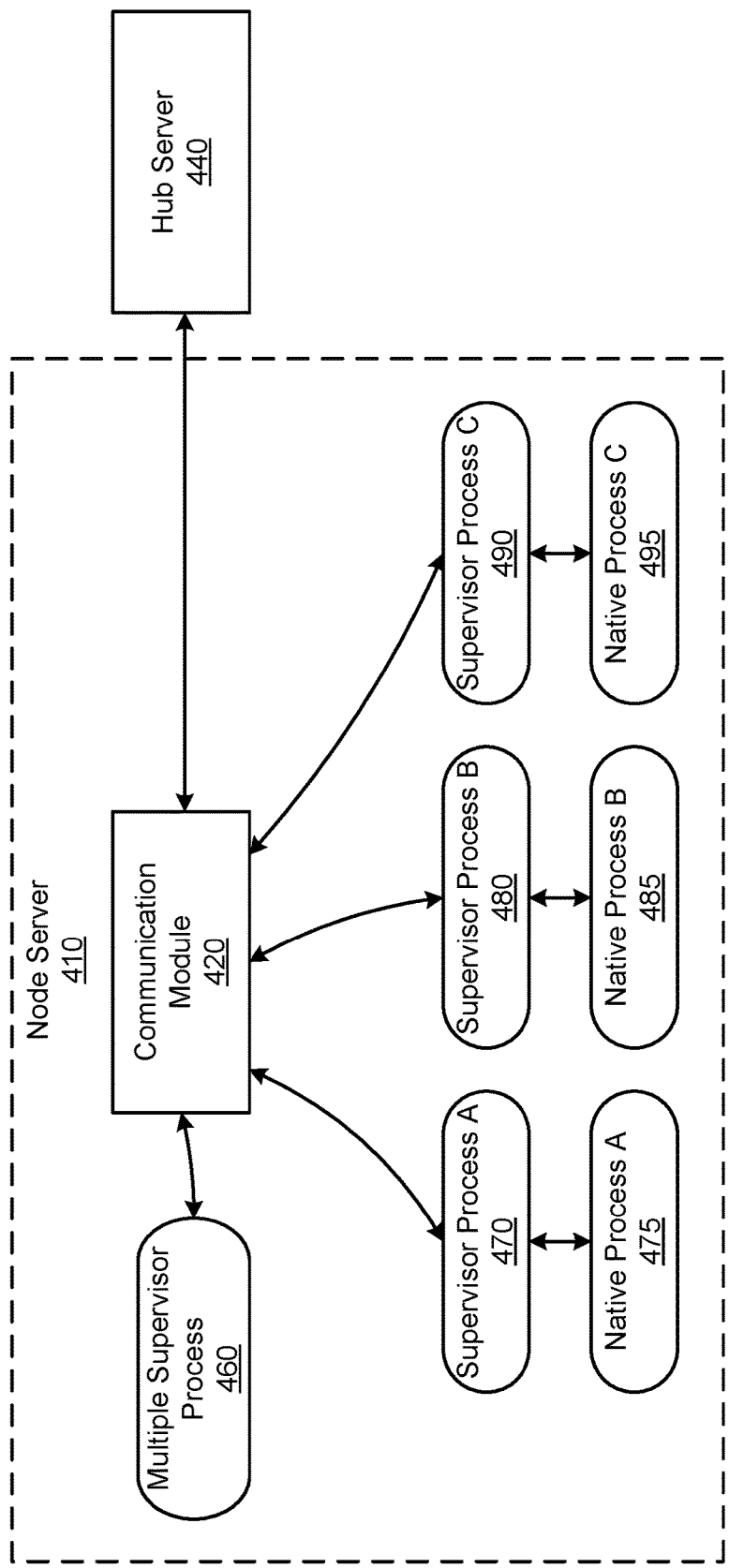
FIG. 4B is a block diagram illustrating a task executed using a multiple supervisor process structure for executing a task, according to an embodiment.

In other embodiments, such as the embodiment of FIG. 4B, a single task can be executed by a plurality of supervisor processes 240 and native processes 245. Depending on the specific task (and how the task was implemented as part of a job or service), the execution of some tasks can be split for execution across multiple native processes 245, which can result in greater efficiency when performing the task. FIG. 4B is a block diagram illustrating a multiple supervisor process structure, according to an embodiment. The environment 450 of FIG. 4B comprises a hub server 440 and a node server 410 including a communication module 420, multiple supervisor process 460, supervisor processes A 470, B 480, and C 490, and native processes A 475, B 485, and C 495, each involved in the execution of the same task. Depending on the task, the native processes A 475, B 485, and C 495, can execute in parallel, in series, or in any combination of parallel and series execution. For example, a legacy application implemented as a service could have multiple native processes 245 involved in the execution of one instance of the legacy application.

The multiple supervisor process 460, according to some embodiments, can manage the overall execution of the task. In some embodiments, performing functions similar to a single supervisor process 240 (such as the supervisor process 430). In this implementation, the multiple supervisor process 460 does not individually manage any native processes 245, but instead is in communication with each of a set of supervisor processes (here, the supervisor processes A 470, B 480, and C 490) each managing a single native process (here, the native processes A 475, B 485, and C 495, respectively). In the embodiment of FIG. 4B, the multiple supervisor process 460 communicates with the other supervisor processes via the communication module 420 of the node server 410, but in other implementations, the multiple supervisor process 460 can communicate with the other supervisor processes A 470, B 480, and C 490 directly.

Task Relationships

As described above, the hub server 120 or service management server 115 can generate a new task based on the result of the execution of one or more other tasks. In some embodiments, a task can depend on other tasks executing on the same node server 140 or a different node server 140. FIGS. 5A, 5B, and 5C are block diagrams illustrating relationships between tasks in a service management platform, according to an embodiment. Here, the FIGS. 5A, 5B, and 5C each represent an example relationship a task may have with one or more other tasks. FIG. 5A includes a task A 510 which is directly depended on by task B 520, which may be assigned to and executed by a different node server 140 than the node server executing task A 520. For example, the result of task A 510 can be a required input for task B 520 or task B 520 can depend on task A 510 for any other suitable reason. FIG. 5B includes the tasks A 530, B 540, and C 550, which are dependent in a recursive loop. In some implementations, after one of the tasks A 530, B 540, or C 550 is initialized, the tasks will continue looping until some suitable end condition is met. Similarly, FIG. 5B includes task A 560, which is depended on by tasks B 570 and C 580, which in turn are both depended on by task D 590.

Task Execution Method

Figure 6:
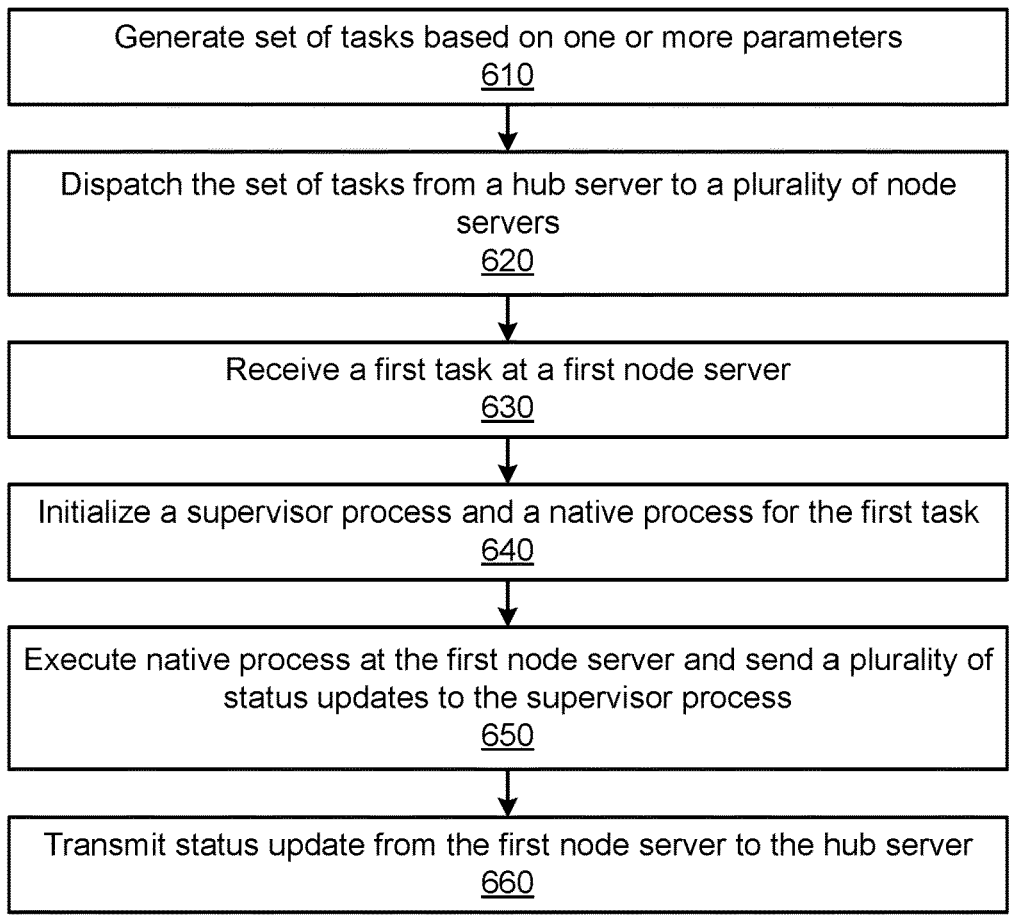
FIG. 6 is a flowchart illustrating a process for generating and executing a task on a service management platform, according to an embodiment.

FIG. 6 is a flowchart illustrating a process for generating and executing a task on a service management platform, according to an embodiment. The process 600 begins when the service management platform 110 generates 610 a set of tasks based on one or more input parameters. For example, the tasks can be generated based on input from a client device 105 based on a job template on a service management server 115. Then, the hub server 120 can dispatch 620 the set of tasks to a plurality of node servers 140 (where node servers 140 can receive any number of tasks to execute out of the plurality of tasks). When a first node server 140 receives 630 a dispatched task, the node server 140 can initialize 640 a supervisor process 240 and a corresponding native process 245 to execute the task at the node server 140. As the task is executed 650, the native process 245 can send a plurality of status updates to the associated supervisor process 240, which can in turn transmit 660 the received status update to the hub server 120 (for example, via the communication module 230 and the general communication module 130).

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
   a processor; and
   a non-transitory computer readable storage medium comprising instructions which, when executed by the processor, cause the processor to perform the steps of:
   generating, based on a job template and one or more parameters, a job of a service;
   separating the job into a set of one or more tasks for execution by a service management platform;
   transmitting the set of tasks to a hub server of the service management platform;
   dispatching, from the hub server to each of a plurality of node servers of the service management platform, one or more tasks of the set of tasks;
   receiving, at a first node server of the plurality of node servers, a first task of the set of tasks to the first node server, the first node server comprising a service management agent; and
   responsive to receiving the first task at the first node server:
   initializing, at the service management agent of the first node server, a first supervisor process associated with the first task;
   executing, on the first node server, a first native process configured to execute the first task and transmit a plurality of status updates of the first task to the first supervisor process;
   receiving, at the first supervisor process from the first native process, a status update of the first task; and
   transmitting, from the service management agent to the hub server, the status update of the first task.

2. The system of claim 1, wherein the service management agent comprises a virtual machine executing an environment other than a native operating system environment of the first node sever.

3. The system of claim 2, wherein the first supervisor process comprises an Erlang supervisor process and the first native process comprises a native operating system process executing in the native operating system environment of the first node sever.

4. The system of claim 1, wherein the status update of the first task comprises an intermediate state of the first task and the steps further comprise:
   responsive to detecting an unexpected termination of the first operating system process, reinitializing, by the first supervisor process, the first native process based on a state of the first task.

5. A method comprising:
   generating, based on a job template and one or more parameters, a job of a service;
   separating the job into a set of one or more tasks for execution by a service management platform;
   transmitting the set of tasks to a hub server of the service management platform;
   dispatching, from the hub server to each of a plurality of node servers of the service management platform, one or more tasks of the set of tasks;
   receiving, at a first node server of the plurality of node servers, a first task of the set of tasks to the first node server, the first node server comprising a service management agent; and
   responsive to receiving the first task at the first node server:
   initializing, at the service management agent of the first node server, a first supervisor process associated with the first task;
   executing, on the first node server, a first native process configured to execute the first task and transmit a plurality of status updates of the first task to the first supervisor process;
   receiving, at the first supervisor process from the first native process, a status update of the first task; and
   transmitting, from the service management agent to the hub server, the status update of the first task.

6. The method of claim 5, wherein the service management agent comprises a virtual machine executing an environment other than a native operating system environment of the first node sever.

7. The method of claim 6, wherein the first supervisor process comprises an Erlang supervisor process and the first native process comprises a native operating system process executing in the native operating system environment of the first node sever.

8. The method of claim 5, wherein the plurality of status updates of the first task comprises a result of the execution of the first task.

9. The method of claim 5, wherein the status update of the first task comprises an intermediate state of the first task and further comprising:
responsive to detecting an unexpected termination of the first operating system process, reinitializing, by the first supervisor process, the first native process based on a state of the first task.

10. The method of claim 5, wherein transmitting, from the service management agent to the hub server, the status update of the first task further comprises transmitting the status update of the first task over a first communication channel common to the hub server and a plurality of service management agents of the plurality of node servers.

11. The method of claim 10, further comprising accessing, by the first supervisor process, a common cache via the first communication channel.

12. The method of claim 10, further comprising transmitting, by the first supervisor process via the common communication channel, a message to a second supervisor process associated with a second task.

13. A non-transitory computer readable storage medium comprising instructions which, when executed by a processor, cause the processor to perform the steps of:
generating, based on a job template and one or more parameters, a job of a service;
separating the job into a set of one or more tasks for execution by a service management platform;
transmitting the set of tasks to a hub server of the service management platform;
dispatching, from the hub server to each of a plurality of node servers of the service management platform, one or more tasks of the set of tasks;
receiving, at a first node server of the plurality of node servers, a first task of the set of tasks to the first node server, the first node server comprising a service management agent; and
responsive to receiving the first task at the first node server:
initializing, at the service management agent of the first node server, a first supervisor process associated with the first task;
executing, on the first node server, a first native process configured to execute the first task and transmit a plurality of status updates of the first task to the first supervisor process;
receiving, at the first supervisor process from the first native process, a status update of the first task; and
transmitting, from the service management agent to the hub server, the status update of the first task.

14. The computer readable storage medium of claim 13, wherein the service management agent comprises a virtual machine executing an environment other than a native operating system environment of the first node sever.

15. The computer readable storage medium of claim 14, wherein the first supervisor process comprises an Erlang supervisor process and the first native process comprises a native operating system process executing in the native operating system environment of the first node sever.

16. The computer readable storage medium of claim 13, wherein the plurality of status updates of the first task comprises a result of the execution of the first task.

17. The computer readable storage medium of claim 13, wherein the status update of the first task comprises an intermediate state of the first task and the steps further comprise:
responsive to detecting an unexpected termination of the first operating system process, reinitializing, by the first supervisor process, the first native process based on a state of the first task.

18. The computer readable storage medium of claim 13, wherein the step of transmitting, from the service management agent to the hub server, the status update of the first task further comprises transmitting the status update of the first task over a first communication channel common to the hub server and a plurality of service management agents of the plurality of node servers.

19. The computer readable storage medium of claim 18, wherein the steps further comprise accessing, by the first supervisor process, a common cache via the first communication channel.

20. The computer readable storage medium of claim 18, wherein the steps further comprise transmitting, by the first supervisor process via the common communication channel, a message to a second supervisor process associated with a second task.

* * * * *